(12) United States Patent
Polland

(10) Patent No.: US 9,729,433 B2
(45) Date of Patent: Aug. 8, 2017

(54) ENHANCED ROUTE TRACING

(71) Applicant: ADC Telecommunications, Inc., Berwyn, PA (US)

(72) Inventor: Joseph Polland, Eden Prairie, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/443,047

(22) PCT Filed: May 1, 2014

(86) PCT No.: PCT/US2014/036310
§ 371 (c)(1),
(2) Date: May 14, 2015

(87) PCT Pub. No.: WO2014/179533
PCT Pub. Date: Nov. 6, 2014

(65) Prior Publication Data
US 2016/0142291 A1    May 19, 2016

Related U.S. Application Data

(60) Provisional application No. 61/818,205, filed on May 1, 2013.

(51) Int. Cl.
*H04L 12/721* (2013.01)
*H04L 12/26* (2006.01)
*H04L 12/741* (2013.01)

(52) U.S. Cl.
CPC .............. *H04L 45/36* (2013.01); *H04L 43/10* (2013.01); *H04L 45/745* (2013.01)

(58) Field of Classification Search
CPC ........ H04L 45/36; H04L 45/745; H04L 43/10
See application file for complete search history.

(56) References Cited

U.S. PATENT DOCUMENTS

| 2002/0018468 A1 | 2/2002 | Nishihara |
| 2002/0080798 A1 | 6/2002 | Hariguchi et al. |

(Continued)

FOREIGN PATENT DOCUMENTS

JP   2007037062   2/2007

OTHER PUBLICATIONS

International Search Authority, "International Search Authority and Written Opinion for Application Serial No. PCT/US2014/036310", "from PCT Application Claiming Priority to U.S. Appl. No. 61/818,205", Aug. 19, 2014, pp. 112, Published in: WO.

(Continued)

*Primary Examiner* — Brian D Nguyen
(74) *Attorney, Agent, or Firm* — Fogg & Powers LLC

(57) ABSTRACT

A network comprises a destination node; a source node configured to output an enhanced route trace packet; and one or more intermediate nodes configured to forward the enhanced route trace packet toward the destination node based on a routing table until the enhanced route trace packet reaches the destination node. Each of the one or more intermediate nodes is further configured to insert identifying information into the enhanced route trace packet. The destination node is configured to send a response packet to the source node containing all the identifying information entered by the one or more intermediate nodes. The destination node is also configured to insert identifying information into the response packet.

19 Claims, 10 Drawing Sheets

(56) References Cited

U.S. PATENT DOCUMENTS

| | | | | |
|---|---|---|---|---|
| 2002/0178405 A1* | 11/2002 | McCullough | ....... | G06F 11/3466 714/45 |
| 2004/0103282 A1* | 5/2004 | Meier | ................ | G06Q 20/3674 713/171 |
| 2005/0053006 A1* | 3/2005 | Hongal | ................... | H04L 12/46 370/236.2 |
| 2005/0094630 A1* | 5/2005 | Valdevit | ................. | H04L 45/12 370/360 |
| 2005/0243733 A1* | 11/2005 | Crawford | .......... | H04L 29/06027 370/252 |
| 2008/0253299 A1* | 10/2008 | Damm | ................ | H04L 12/2697 370/252 |

OTHER PUBLICATIONS

"Internet Protocol DARPA Internet Program Protocol Specification", Sep. 1981, pp. 1-75, Publisher: Information Sciences Institute University of Southern California, Published in: Arlington, Virginia.

* cited by examiner

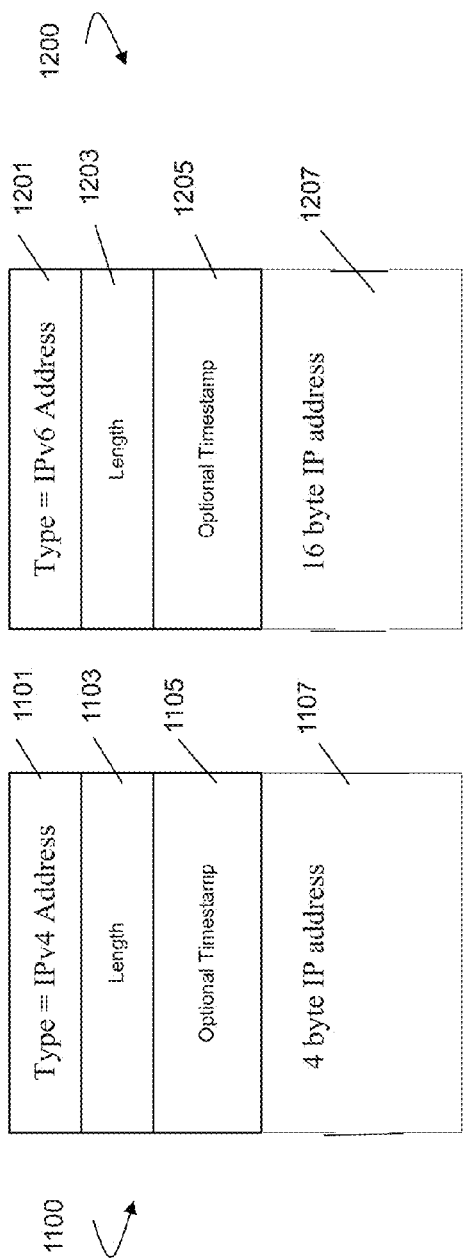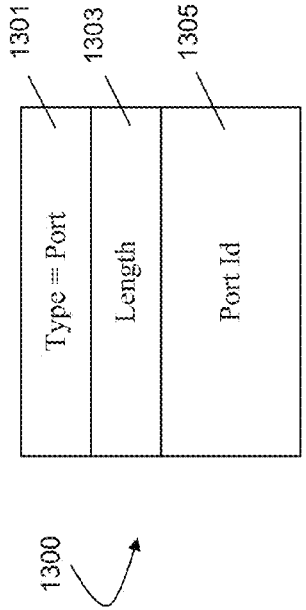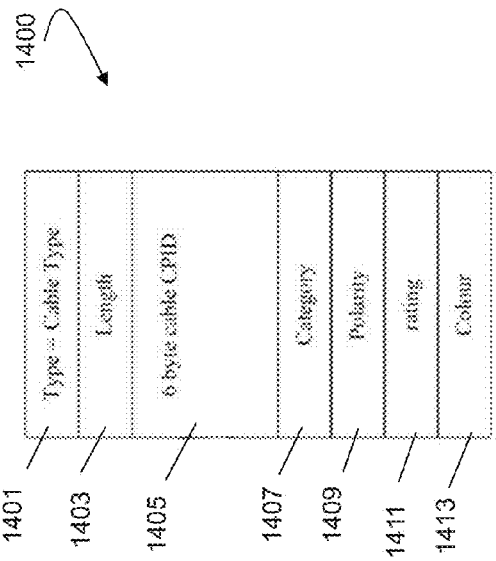

ENHANCED ROUTE TRACING

CROSS-REFERENCE TO RELATED APPLICATIONS

This application claims priority to International Patent Application No. PCT/US2014/036310 filed on May 1, 2014, which claims priority to U.S. Provisional Patent Application No. 61/818,205, filed on May 1, 2013. The U.S. Provisional Patent Application No. 61/818,205 is entitled "Enhanced Route Tracing", is referred to herein as the '205 application, and is incorporated herein by reference.

BACKGROUND

In various situations it is desirable to trace the route that a packet travels from a source node to a destination node, such as, but not limited to, troubleshooting when packets are not arriving at the destination, testing new network configurations, checking end to end routes, multi domain routes, or for building a routing table, etc. Typical route trace procedures require at least one message for each node in the path from the source node to the destination node plus one packet for the destination node itself.

SUMMARY

In one embodiment, a network is provided. The network comprises a destination node; a source node configured to output an enhanced route trace packet; and one or more intermediate nodes configured to forward the enhanced route trace packet toward the destination node based on a routing table until the enhanced route trace packet reaches the destination node. Each of the one or more intermediate nodes is further configured to insert identifying information into the enhanced route trace packet. The destination node is configured to send a response packet to the source node containing all the identifying information entered by the one or more intermediate nodes. The destination node is also configured to insert identifying information into the response packet.

DRAWINGS

Understanding that the drawings depict only exemplary embodiments and are not therefore to be considered limiting in scope, the exemplary embodiments will be described with additional specificity and detail through the use of the accompanying drawings, in which:

FIGS. 11-14 depict embodiments of exemplary Type Length Value (TLV) elements used in an enhanced route trace header.

Figure 1:
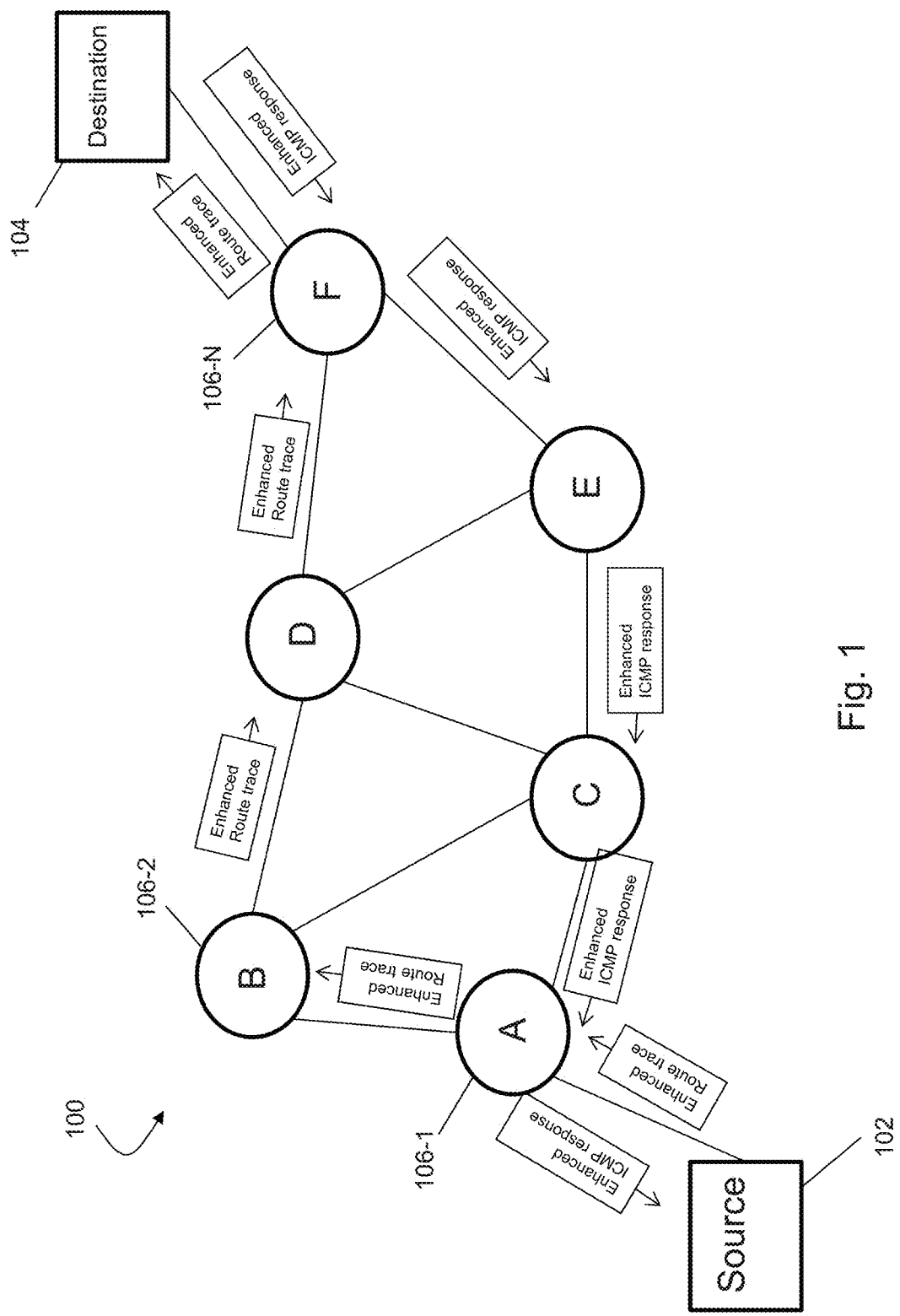
FIG. 1 is a block diagram of one embodiment of an exemplary network.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 is a block diagram of one embodiment of a network 100 which implements enhanced Internet Protocol (IP) route tracing. In particular, network 100 includes a source node 102, a destination node 104, and a plurality of intermediate nodes 106-1 . . . 106-N (also labeled nodes A-F in FIG. 1). The source node 102 and destination node 104 are network hosts in this example. However, it is to be understood that the source node 102 and the destination node 104 are not required to be network hosts. For example, in some embodiments, one or both of the source node 102 and the destination node 104 are routers. Each of the plurality of intermediate nodes 106-1 . . . 106-N is a core router, in this example, configured to route IP data packets through the network 100. However, it is not required that each intermediate node be implemented as a core router. For example, in other embodiments, one or more of the intermediate nodes 106 are implemented as other network devices, such as edge routers. The intermediate nodes 106-1 . . . 106-N can be members of the same or different core networks (autonomous systems, routing domains). When each intermediate node 106 receives a packet, it determines where to forward the packet using a routing table as known to one of skill in the art. Thus, each packet sent from the source node 102 does not necessarily travel the same path to the destination node 104.

In various situations it is desirable to trace the route that a packet travels from the source node 102 to the destination node 104, such as, but not limited to, troubleshooting when packets are not arriving at the destination, testing new network configurations, checking end to end routes, multi domain routes, or for building a routing table, etc. Typical route trace procedures require at least M packets be sent from the source node 102 for M intermediate nodes 106 in a path from source to destination. That is, at least one message is required for each intermediate node 106 in the path from the source node 102 to the destination node 104 plus one packet for the destination node 104 itself. In contrast, the source node 102, in the exemplary embodiment of FIG. 1, sends one packet using the enhanced route trace described herein regardless of the number of intermediate nodes 106 in the path between the source node 102 and the destination node 104. For example, in the embodiment shown in FIG. 1, an enhanced route trace packet is sent from the source node 102 and forwarded via nodes A, B, D, and F to the destination node 104. Each intermediate node 106 is configured to insert data into the packet such as a node address which identifies the respective intermediate node. In addition, in some embodiments, each intermediate node 106 is further configured to insert additional details regarding the route the packet travels, such as ingress and egress port information, cable information, etc., as described in more detail below.

Once the destination node 104 receives the enhanced route trace packet, it generates an enhanced Internet Control Message Protocol (ICMP) response packet which includes all the data inserted by the intermediate nodes and additional data inserted by the destination node 104. Thus, the enhanced ICMP response packet contains information on the path or route traveled from the source node 102 to the destination node 104. The enhanced ICMP response packet is then routed to the source node 102. The route the enhanced ICMP response packet takes may be different from the route taken by the enhanced route trace packet. Thus, the enhanced route trace requires fewer packets to trace a route and provides more information than typical route traces. Additionally, the enhanced route trace provides a more accurate and complete route taken by the packet as compared to conventional route traces. For example, in a conventional route trace, one or more of the packets may provoke a response from a node that the packet sent to the destination node does not traverse. For example, a packet sent from the source node 102 may be received at node C and provoke a response from node C. However, the packet actually received by the destination node 104 may travel to node B and then to node D, effectively skipping node C.

Figure 2:
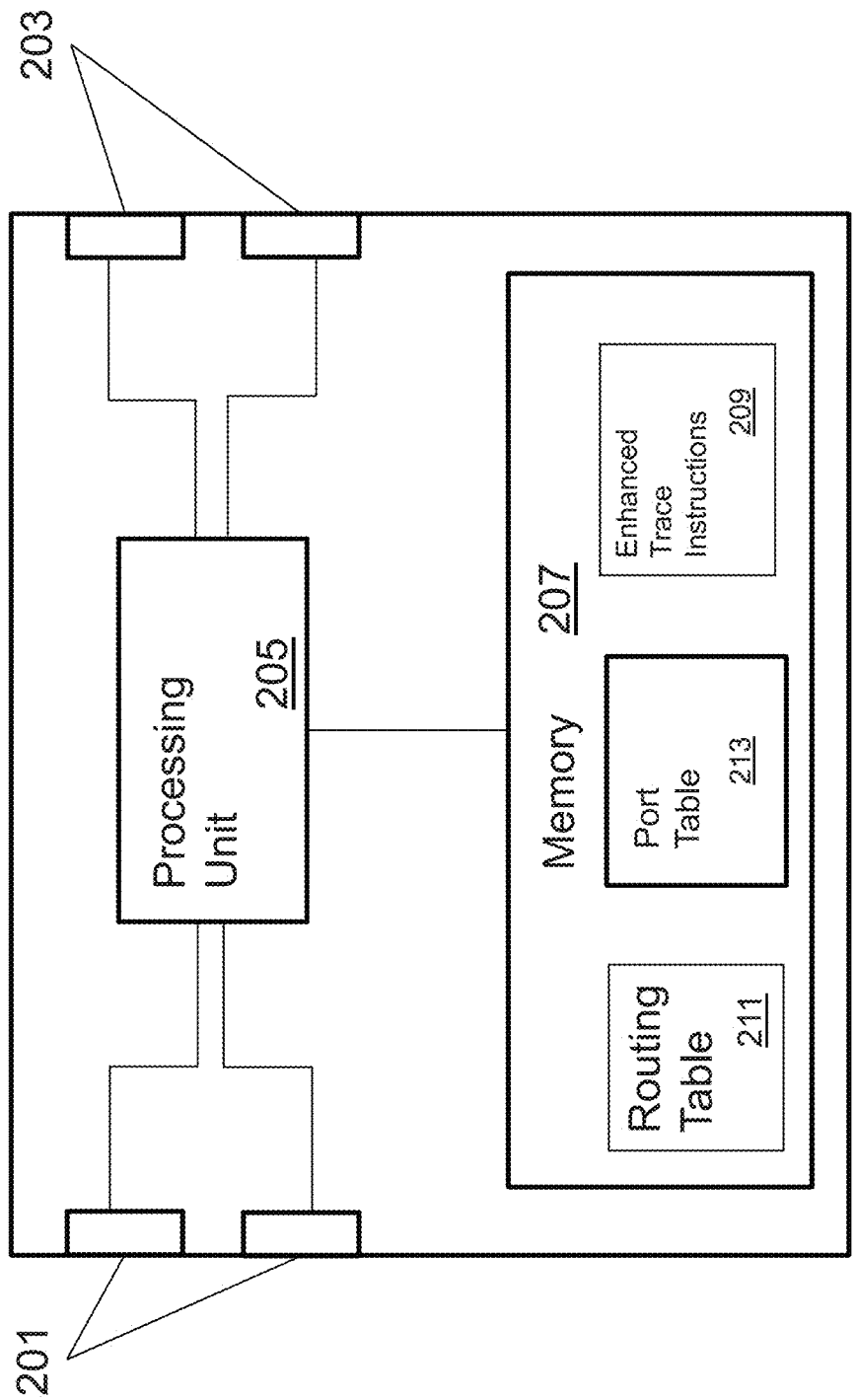
FIG. 2 is a high level block diagram of one embodiment of an exemplary router.

FIG. 2 is a high level block diagram of one embodiment of a node 200. Node 200 can be implemented as a node in network 100, such as source node 102, destination node 104, or intermediate node 106. Node 200 includes a plurality of ingress ports 201 and a plurality of egress ports 203. It is to be understood that, in some embodiments, each port is bi-directional and can receive as well as transmit data. Thus, for a given packet, an ingress port is the port over which the given packet was received and the egress port is the port over which the given packet was forwarded or transmitted. Thus, a single port can be an ingress port for one packet and an egress port for another packet. In addition, node 200 includes a processing unit 205 and memory 207.

Processing unit 205 includes or functions with software programs, firmware or other computer readable instructions for carrying out various methods, process tasks, calculations, and control functions, used in the implementing the enhanced route trace described herein.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

For example, in this embodiment, enhanced route trace instructions 209 are stored on memory 207. The enhanced route trace instructions 209, when executed by processing unit 205, cause the processing unit to implement the enhanced route trace. In addition, a routing table 211 and a port table 213 are stored on memory 207. The routing table 211 is used by the processing unit 205 to determine over which egress port 203 to forward packets received on one of the ingress ports 201. In particular, the routing table 211 includes information regarding the sub-networks and ports associated with particular routes. Alternatively, in some embodiments, the routing table 211 does not include port information and a separate sub-network to port table is stored on the memory 207. In addition, there can be multiple egress ports 203 in the routing table for a given route which are equally good. Once an egress port 203 to be used is selected, the processing unit 205 uses the port identification (ID) of the selected egress port 203 as an index to the port table 213 to obtain additional information, such as the cable information.

In particular, the port table 213 includes a plurality of entries, each entry corresponding to a specific ingress port 201 or egress port 203. Each entry can include information such as one or more cable attributes of the cable coupled to the corresponding port. For example, the cable attributes can include, but are not limited to, cable ID, cable type, cable color, polarity, length, media, category, rating, and/or optical mode. It is to be understood that different attributes can be used for each entry in the port table 213. For example, in some embodiments, an entry for a port coupled to an optical fiber could include an attribute for optical mode, whereas an entry for another port coupled to a copper cable does not. Table 1 below lists some possible exemplary values for some of the exemplary attributes discussed above.

TABLE 1

| ATTRIBUTE | EXEMPLARY VALUES |
| --- | --- |
| Cable Type | Fiber, Copper |
| Cable Polarity | Copper 568B, Copper crossover, Fiber A to A, Fiber A to B |
| Category | Copper cat. 5, copper cat. 5e, copper cat. 6, copper cat. 6a, copper cat. 7, copper cat. 8, fiber single mode, fiber multi-mode |
| Rating | Shielded twisted pair, screened twisted pair, screened shielded twisted pair, shielded foiled twisted pair |
| Optical mode | OM1, OM2, OM3, OS1, OS2 |

In addition, a given port may correspond to more than one entry in the port table 213. For example, an intermediate node can be coupled to another node via a plurality of segments, each segment corresponding to a separate single cable or wire. Thus, in such an embodiment, a port in the intermediate node is associated with a plurality of entries in the port table 213. Each cable entry in such an embodiment can include a next cable entry pointer and/or a previous cable entry pointer to link the cables and show the route from the intermediate node to the other node. In some embodiments, cable entries for each port appear in topological order. Therefore, the first cable in the list is directly attached to the port. The next cable is adjacent to the first cable and so on. The last cable, assuming no information gaps, is directly connected to the far end port in such an embodiment.

It is to be understood that, although the routing table 211, port table 213 and enhanced route trace instructions 209 are stored on the same memory 207 in this example, the routing table 211, port table 213 and enhanced route trace instructions 209 can be stored on separate memory devices in other embodiments. For example, in one embodiment, the enhanced route trace instructions 209 are stored on a non-volatile memory whereas the routing table 211 and port table 213 are stored on a volatile memory.

Figure 3:
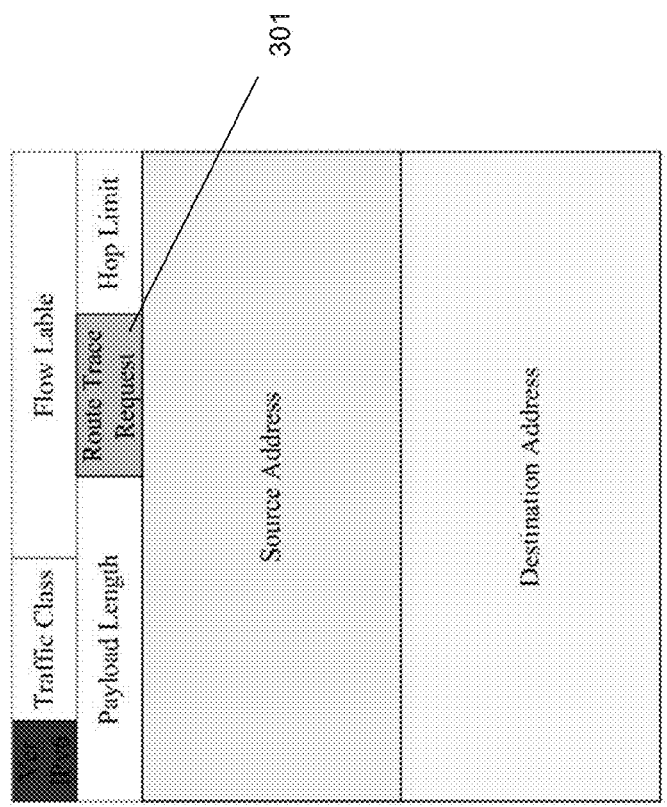
FIG. 3 is a diagram of one embodiment of an IPv6 packet having a next header pointer set to an enhanced route trace header.
Figure 4:
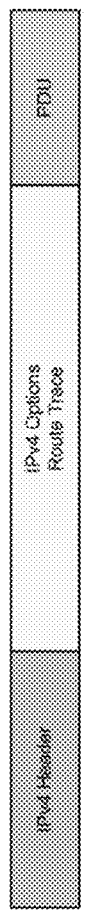
FIG. 4 is a diagram of one embodiment of an IPv4 packet having an enhanced route trace in an options field.

In operation, when an enhanced route trace packet is received over one of the ingress ports 201, the processing unit 205 inserts identifying information into a respective enhanced route trace field that is added to the standard packet header. A diagram of an Internet Protocol version 6 (IPv6) having a next header field set to point to an enhanced route trace header is shown in FIG. 3. As shown in FIG. 3, the next header field 301 is set to the enhanced route trace request header. FIG. 4 depicts an exemplary Internet Protocol version 4 (IPv4) enhanced route trace packet. As shown in FIG. 4, the enhanced route trace has been added to the IPv4 options field following the standard IPv4 header.

Figure 5:
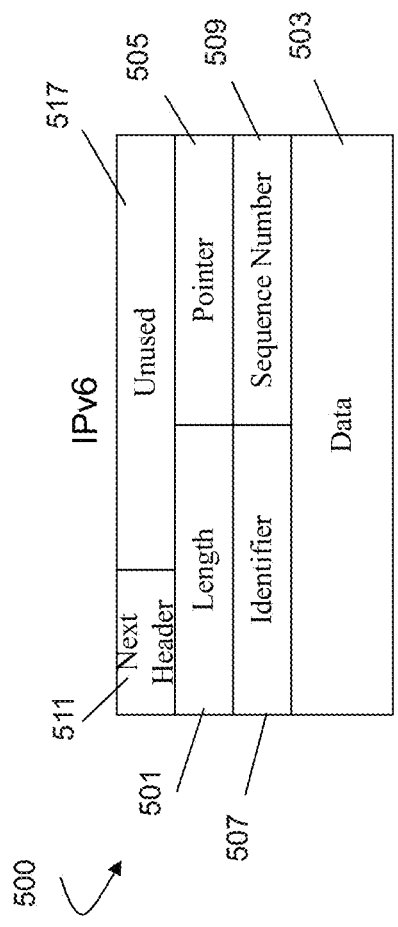
FIG. 5 is a diagram of one embodiment of an IPv6 enhanced route trace header.
Figure 6:
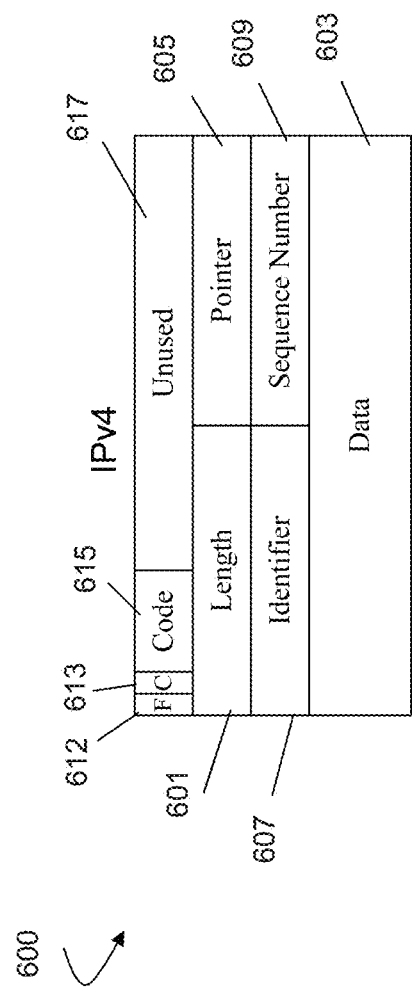
FIG. 6 is a diagram of one embodiment of an IPv4 enhanced route trace header.

FIG. 5 is a diagram of an exemplary route trace request header 500 for an IPv6 packet. Similarly, FIG. 6 is a diagram of an enhanced route trace options field header 600 for an IPv4 packet. As used herein, the term "enhanced route trace header" includes both an IPv6 extension header and an IPv4 options field header, depending on the specific implementation of the network. Each of the headers 500 and 600 includes a length field 501, 601 which specifies the length of the respective data field 503, 603. In some embodiments, the length of the data field 503, 603 is set to zero. In such embodiments, each node updates the length to accommodate the insertion of the respective data (e.g. node address, cable information, port ID, etc.). Hence, in such embodiments, the length of the data field 503, 603 is dynamic which ensures it is able to accommodate the data inserted from each of the nodes in the path from source to destination. In addition, such embodiments more efficiently use the bandwidth as unused space in the data field is reduced.

In other embodiments, the length of the data field 503, 603 is a static/fixed length specified in the length field 501, 601. In such embodiments, the length should be chosen to accommodate the anticipated amount of data that will be entered along the path from source to destination. Although more space may go unused than with a dynamic length, processing of the enhanced route trace packet is more efficient and quicker. In particular, each intermediate node would not be required to do memory allocation and move the data in the enhanced route trace packet about when processing in order to create the space needed for insertion of additional data.

Each of the headers 500, 600 also includes a pointer field 505, 605. The pointer field 505, 605 indicate where the next insertion point is in the data field 503, 603 so that data already inserted is not corrupted by subsequent insertion of data. For example, the pointer field 505, 605 is initially set at zero. After each insertion of data, the pointer field 505, 605 is updated by the respective node that is inserting data to indicate an offset for the next entry.

In the examples shown in FIGS. 5 and 6, the headers 500, 600 also include an identifier field 507, 607 and a sequence number field 509, 609. The identifier field 507, 607 and sequence number field 509, 609 are used to identify route trace initiation and response. Header 500 includes a next header field 511. The next header field 511 points to the next header which follows header 500 in the enhanced route trace IPv6 packet. A next header field is included in each header in an IPv6 packet to enable the addition of additional headers making the IPv6 packet extensible. Header 600 includes flags 612 and 613 which indicate that the header should not be copied to fragments. Header 600 also includes a code field 615 which identifies the options field header 600 as an enhanced route trace. The unused field 517, 617 is placed to align the other fields but does not contain data used for the enhanced route trace. The unused fields 517, 617 also provide space for future enhancements.

As stated above, the processing unit 205 inserts identifying information into the respective enhanced route trace field of the received enhanced route trace packet and determines over which egress port 203 to forward the enhanced route trace packet based on the routing table 211. For example, in some embodiments, the processing unit 205 adds information regarding the ingress port 201 and the node address. The processing unit 205 utilizes the routing table 211 to identify the egress port 203 over which to forward the packet. Additionally, in some embodiments, the enhanced route trace packet includes a routing header which specifies information used in computing the route the packet is to take from the source to the destination.

After selecting the egress port 203, the processing unit 205 inserts information regarding the egress port 203 into the respective enhanced route trace field. In addition, the processing unit 205 utilizes the selected egress port to obtain cable information from the port table 213, in some embodiments. The cable information is then inserted into the enhanced route trace header. The cable information associated with each port entry is a list of one or more cables, if known. The list of cables is in topological order in some embodiments. The list is traversed and the corresponding cable information is appended to the route trace in the order the list is traversed. For example, in some embodiments, a Type Length Value (TLV) element is created from each cable entry in the list, as described in more detail below. Therefore, the cable entries appear in the route trace in the same order as the packet would pass through them.

If the node 200 is the destination node, processing unit 205 generates an enhanced ICMP response message which includes the entire path information in the enhanced route trace packet received over an ingress port 201. The processing unit 205 inserts identifying information at the end of the path information and sends the enhanced ICMP response to the source over one of the egress ports 203. The enhanced ICMP response message does not include a route trace request field as in the enhanced route trace packet.

In this embodiment, each of the ingress ports 201 and egress ports 203 is configured to receive cables which provide information regarding the respective cable. In particular, each connector end of the cables includes an embedded processor or microchip Electrically Erasable Programmable Read-Only Memory (EEPROM) which provides information regarding the respective cable, such as, but not limited to data regarding the cable length, cable color, cable type, or other cable characteristics, etc. For example, the cables can be implemented using the Connection Point Identification Technology™ (CPID) in the Quareo™ system produced by TE Connectivity. Alternatively, the node 200 can query a cable management system to obtain the cable information. The cables can be implemented using optical fiber, copper wire, or any other suitable medium for use in cables.

Hence, the identifying information inserted by the processing unit 205 into the enhanced route trace packet and/or the enhanced ICMP response includes, but is not limited to, a node address, port identification (ID), and/or cable information. In this way, the enhanced route trace is able to provide a more complete picture of the route taken by the packet than can be obtained by a typical route trace packet. For example, the enhanced route trace packet identifies not only the node but also which ports are coupled to which nodes and over which cables. Additional details are also available depending on the information provided. For example, when cable length is provided, the physical length from the source to the destination can be determined. In addition, if it is desired that a route between a source and a destination comprise only optical fiber or only copper, this aspect of the route can be verified via the enhanced route trace. Additionally, if a specific service requirement is desired, the cable types in the route can be checked via the enhanced route trace to ensure compliance. For example, if it is desired to have a 10 gigabyte service, the enhanced route trace can be used to make sure that no category 5 cables are used since they are not in compliance with the desired service requirement.

Figure 7:
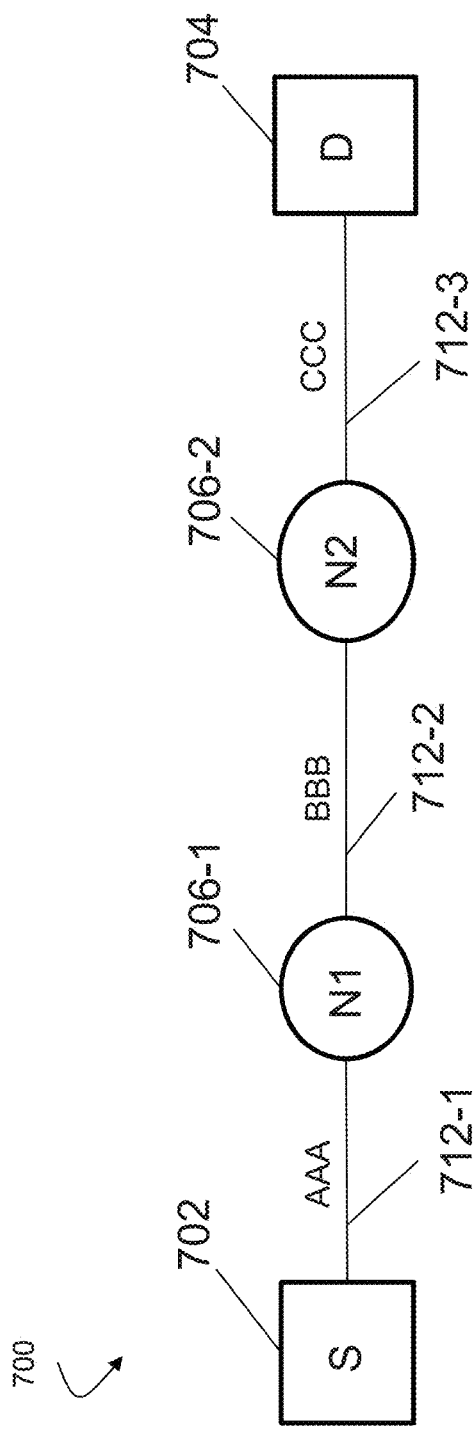
FIG. 7 is a block diagram of an exemplary network.
Figure 8:
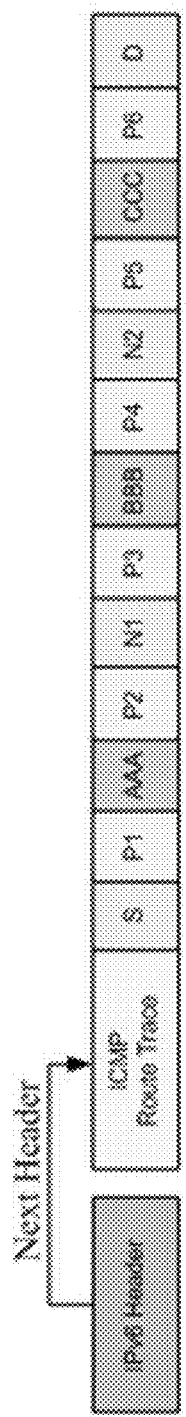
FIG. 8 depicts an exemplary enhanced route trace for the network of FIG. 7.

For purposes of explanation, FIG. 7 depicts a simplified network 700 having two intermediate nodes 706 between a source node 702 and 704. FIG. 8 depicts an exemplary enhanced ICMP response including the route trace information obtained from an enhanced route trace packet that passed through the exemplary network 700 from the source node 702 to the destination node 704. As shown in FIG. 7, source node 102 is coupled to intermediate node 706-1 via a cable 712-1 (labeled AAA). The intermediate node 706-2 is coupled to intermediate node 706-2 via a cable 712-2 (labeled BBB). Finally, the intermediate node 706-2 is coupled to the destination node 704 via a cable 712-3 (labeled CCC). As discussed above, in this embodiment, each of the cables 712 and nodes 702, 704, 706 are configured to implement an intelligent infrastructure management system such as the Quareo™ system mentioned above.

In operation, when sending an enhanced route trace packet, the source node 702 inserts its node address, the port identification (ID) of the egress port via which the enhanced route trace packet is sent, and the cable information provided by the intelligent cable. The information inserted by the source node 702 is represented as the blocks labeled 'S', 'P1', and 'AAA' in FIG. 8. When the intermediate node 706-1 receives the enhanced route trace packet, it is also configured to enter similar information. In some embodiments, the intermediate node 706-1 is configured to determine if the information for the cable over which node 706-1 received the enhanced route trace packet is already present. In this example, node 706-1 would determine if the information for the cable AAA is already inserted. In other embodiments, each node enters the cable information regardless of what has been entered by other nodes. Thus, there may be duplicate entries for the cable information.

In this embodiment, node 706-1 does not enter the information for cable AAA as it was already present. However, node 706-1 enters the port ID (block 'P2' in FIG. 8) of the ingress port over which the enhanced route trace packet was received, the node address of node 706-1 (block N1 in FIG. 8), the port ID (block 'P3' in FIG. 8) of the egress port over which the enhanced route trace packet is forwarded, and the cable information (block 'BBB' in FIG. 8) of the cable coupled to the egress port.

Intermediate node 706-2 is configured similar to node 706-1 and inserts the port ID (block 'P4' in FIG. 8), the node address of node 706-2 (block 'N2' in FIG. 8), the port ID of the egress port (block 'P5' in FIG. 8), and the cable information (block 'CCC' in FIG. 8) of the cable coupled to the egress port. Upon receiving the enhanced route trace packet, the destination node 704 extracts the information inserted by the other nodes and places the extracted information in the enhanced ICMP response packet, as shown in FIG. 8. In addition, the destination node 704 inserts the port ID (block 'P6' in FIG. 8) and the node address of the destination node 704 (block 'D' in FIG. 8). The enhanced ICMP response packet is then sent to the source node 702.

As can be seen in FIG. 8, the information from each node is inserted back to back in order so that the continuous path traveled by the packet is shown in the enhanced ICMP response packet. As also shown in FIG. 8, a next header field in the IPv6 header indicates the starting point of the ICMP route trace information. If one of the nodes which received the enhanced route trace packet is not configured to insert the identifying information or if one of the cables is not configured to provide information regarding the cable, the node will still forward the enhanced route trace packet per the routing table and destination address contained in the enhanced route trace packet. The path sent in the corresponding enhanced ICMP message will then contain a gap in the information provided for the node or cable which did not provide the requested information that the other nodes are configured to provide. The enhanced route trace still provides more information than that available from typical route traces. In addition, the enhanced route trace can be used to identify the gaps where either cable or node information is not available.

Figure 9:
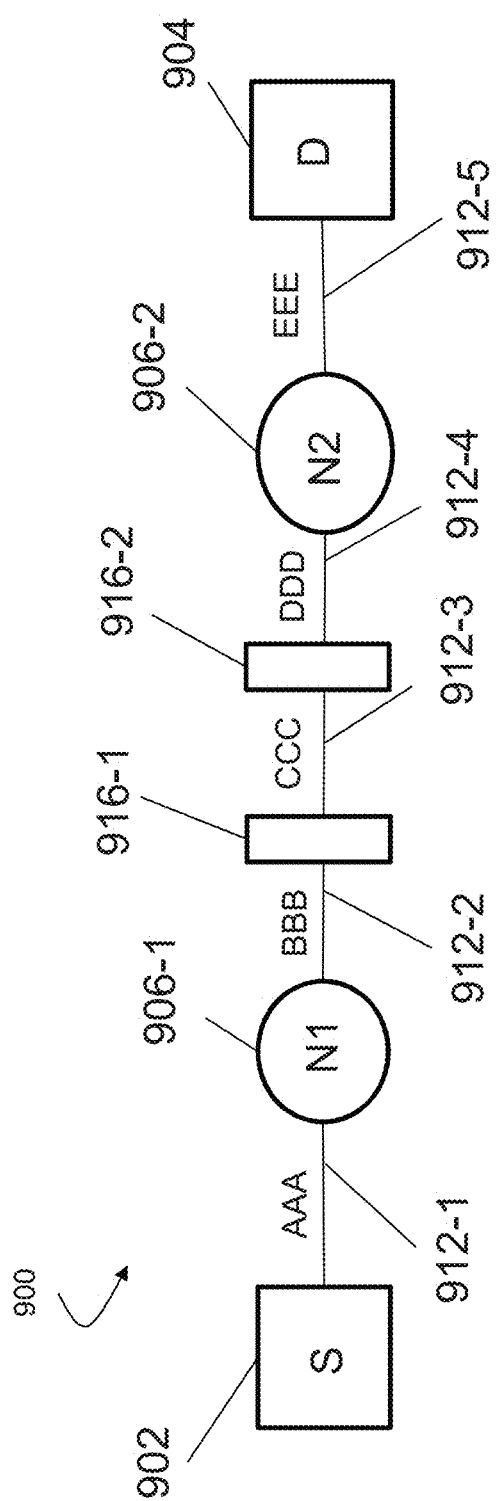
FIG. 9 is a block diagram of another exemplary network.
Figure 10:
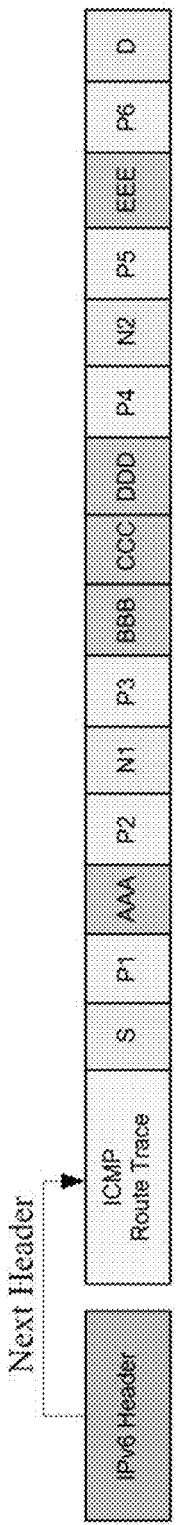
FIG. 10 depicts an exemplary enhanced route trace for the network of FIG. 9.

In some embodiments, additional devices, such as patch panels or chassis, may be inserted between nodes. For example, in FIG. 9, patch panels 916-1 and 916-2 are located between nodes 906-1 and 906-2. Thus, nodes 906-1 and 906-2 are coupled together via cables 912-2, 912-3 and 912-4. This information is conveyed in the route trace shown in FIG. 10 as blocks BBB, CCC, and DDD, respectively. Although cable 912-3 is not directly coupled to either node 906-1 or 906-2, information about cable 912-3 can be provided to either or both nodes 906-1 and 906-2 via an intelligent cable management system such as the Quareo™ system. By including the additional data concerning the cable 912-3, the enhanced route trace provides a more complete picture of the route taken by the packet.

The information provided in the enhanced route trace can be used for identifying error conditions, such as, but not limited to, time exceeded, no route to destination, address out of scope, etc. For example, each enhanced route trace packet includes a limit to keep the packet from propagating on the network indefinitely. For IPv6 packets, the limit is referred to as a hop limit and for IPv4 packets the limit is a Time To Live (TTL) limit. Typically the limit is given an initial value by the source node and decremented at each intermediate node. Once the limit reaches 0, the last intermediate node sends an ICMP error message back to the source node with a copy of the original enhanced route trace packet as payload. Thus, the ICMP error message includes the route trace extension header, with all node addresses, port IDs, cable information, etc. up to the point of failure. Therefore, a trace of the route up to the point of failure is available to the source node.

Additionally, if an intermediate node is dropping the enhanced route trace packet in error, rather than forwarding it on, an iterative route trace technique can be used to identify failed node. That is, the limit (e.g. hop limit or TTL) is initially sent to 1 so that the first intermediate node sends back and ICMP error message after decrementing the limit. Then, a second enhanced route trace packet is sent with the limit set to 2 so that the next intermediate node after the first intermediate node sends back an ICMP error message. This continues until the ICMP error message is not returned. In this way, the entire path, including node address, cable information, port ID, etc. can be determined up to the last intermediate node which is operating properly. Thus, the enhanced route trace packet can be used to more precisely identify error points.

Although the above examples include node address, cable information, and port ID, it is to be understood that the specific information collected may vary based on the specific implementation. For example, the specific information regarding the cable (e.g. color, length, type, etc.) can vary. In addition, in some embodiments, the enhanced route trace packet includes a field or flag which identifies to each intermediate node the information to be collected. For example, a separate field or flag can be included to enable or disable the respective cable information, port information, etc.

In some embodiments, Type Length Value (TLV) elements are used to insert the information into the enhanced route trace packet at each node. For example, FIG. 11 is a diagram of an exemplary TLV element 1100 for inserting an IPv4 node address. The TLV element 1100 includes a type field 1101 which indicates it is providing an IPv4 node address. Field 1103 is a length field specifying the length of the data field 1107 for the node address. Field 1105 is an optional timestamp field for indicating either the time that the respective node received the enhanced route trace packet, the time when the TLV element 1100 was inserted into, or the time when the enhanced route trace packet was forwarded.

Similarly, FIG. 12 is a diagram of an exemplary TLV element 1200 for inserting an IPv6 node address. The format of TLV element 1200 is similar to TLV element 1100. However, the data field 1207 is a larger size for a larger node address according to the IPv6 requirements. FIG. 13 is a diagram of an exemplary TLV element 1300 for inserting port information. In particular, TLV element 1300 includes a type field 1301 for indicating it is providing a port address. TLV element 1300 also includes a length field 1303 for indicating the length of the data field 1305 into which the port ID is inserted.

FIG. 14 is a diagram of an exemplary TLV element 1400 for providing cable information. TLV element 1400 includes a type field 1401 which indicates the type of cable (e.g. copper, fiber, etc.). Field 1403 specifies the length of the cable and field 1405 provides a unique cable ID. Fields 1407-1413 provide information on the category, polarity, rating, and color of the cable. It is to be understood that the TLV elements 1100-1400 shown in FIGS. 11-14, respectively, are provided by way of example and not by way of limitation. In particular, it is to be understood that other information can be included in each respective TLV element in addition to or in lieu of the information shown in FIG. 11-14. For example, the cable TLV element 1400 can include other information regarding the cable in addition to or in lieu of that shown in FIG. 14. Additionally, a subset of the information shown in FIG. 14 can be obtained in some embodiments.

Figure 15:
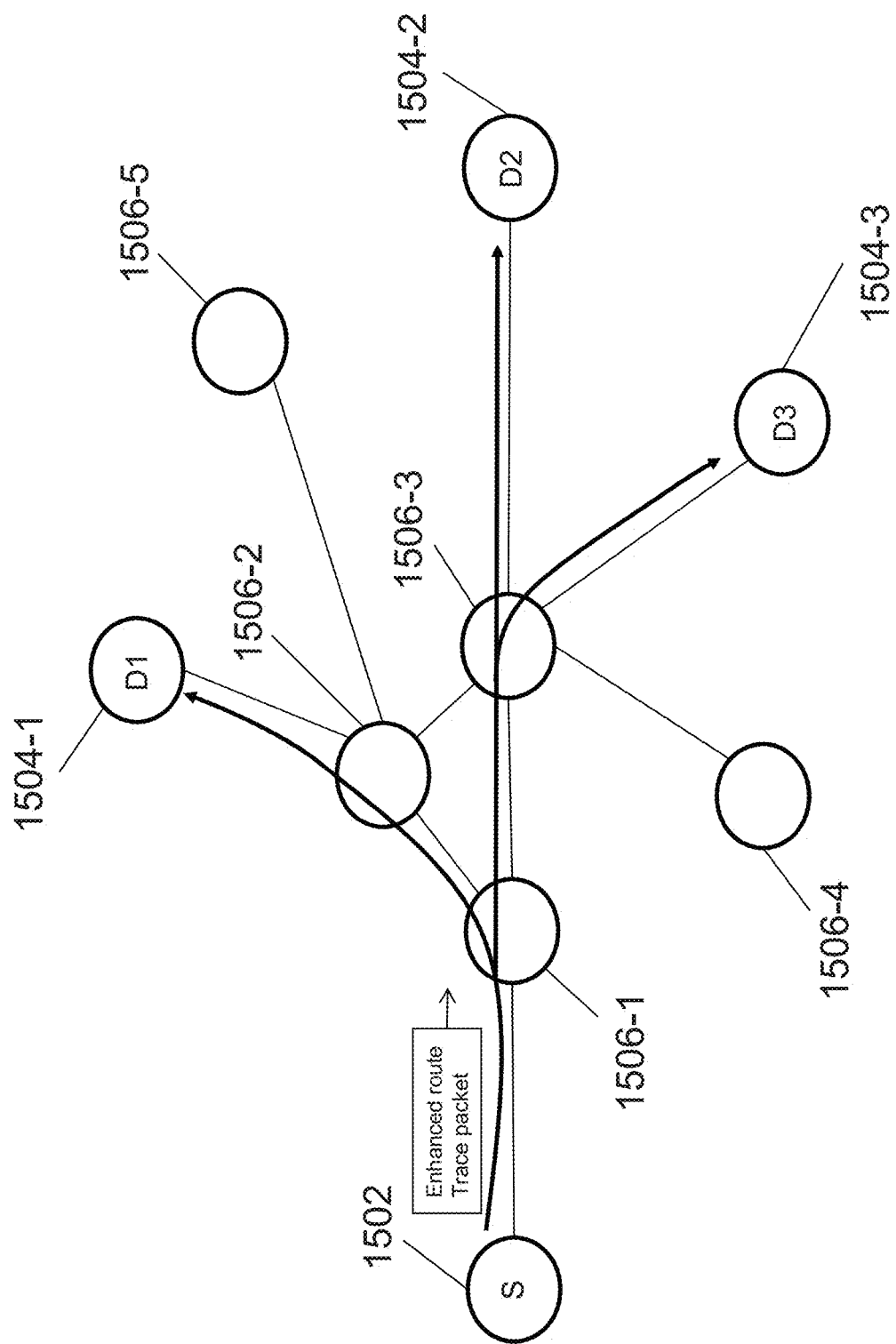
FIG. 15 is a block diagram of one embodiment of another exemplary network.

Additionally, as shown in FIG. 15, multicast route tracing is supported in some embodiments. For example, in FIG. 15, an enhanced route trace is sent from source node 1502 to each of three multicast destination nodes 1504-1, 1504-2, and 1504-3. A unique route trace is created for each multicast destination and each multicast destination node 1504 returns a unique enhanced ICMP response to the source node 1502. A replication point is a point where the enhanced route trace packet is replicated to be forwarded to more than one other node. For example, intermediate nodes 1506-1 and 1506-3 are replication points in FIG. 15. At each replication point, the intermediate node 1506-1, 1506-3 inserts identifying information regarding the ingress port, cable information coupled to the ingress port, and/or node address into each copy of the enhanced route trace packet. However, each intermediate node 1506-1, 1506-3 at a replication point also inserts unique information regarding the egress cable and/or egress port for the respective copy of the enhanced route trace packet. The intermediate node 1506-1, 1506-3 routes each packet towards its respective destination.

Figure 16:
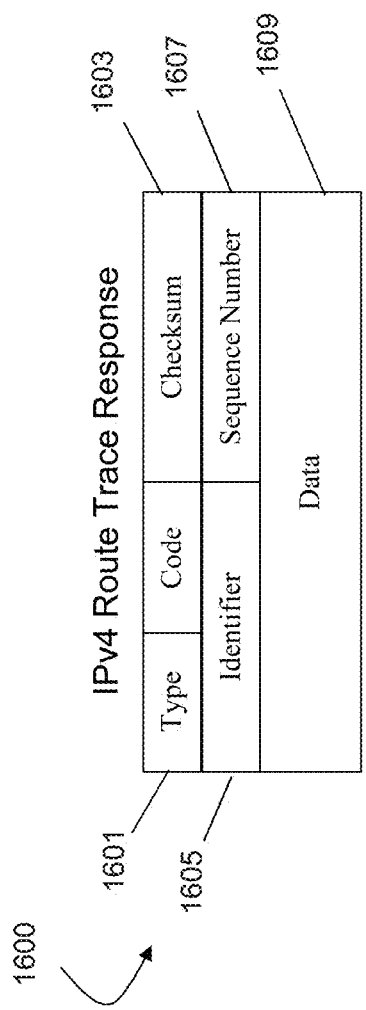
FIG. 16 is a diagram of one embodiment of an exemplary enhanced IPv4 ICMP response message header.

FIG. 16 is a diagram of one embodiment of an exemplary enhanced IPv4 ICMP response message header 1600. Header 1600 includes a type field 1601 which indicates that the message is a route trace response. Header 1600 also includes an ICMP checksum 1603. Identifier field 1605 and sequence number field 1607 used to identify route trace initiation and response. The data field 1609 contains a sequence of TLV values tracing the route, as discussed above.

Figure 17:
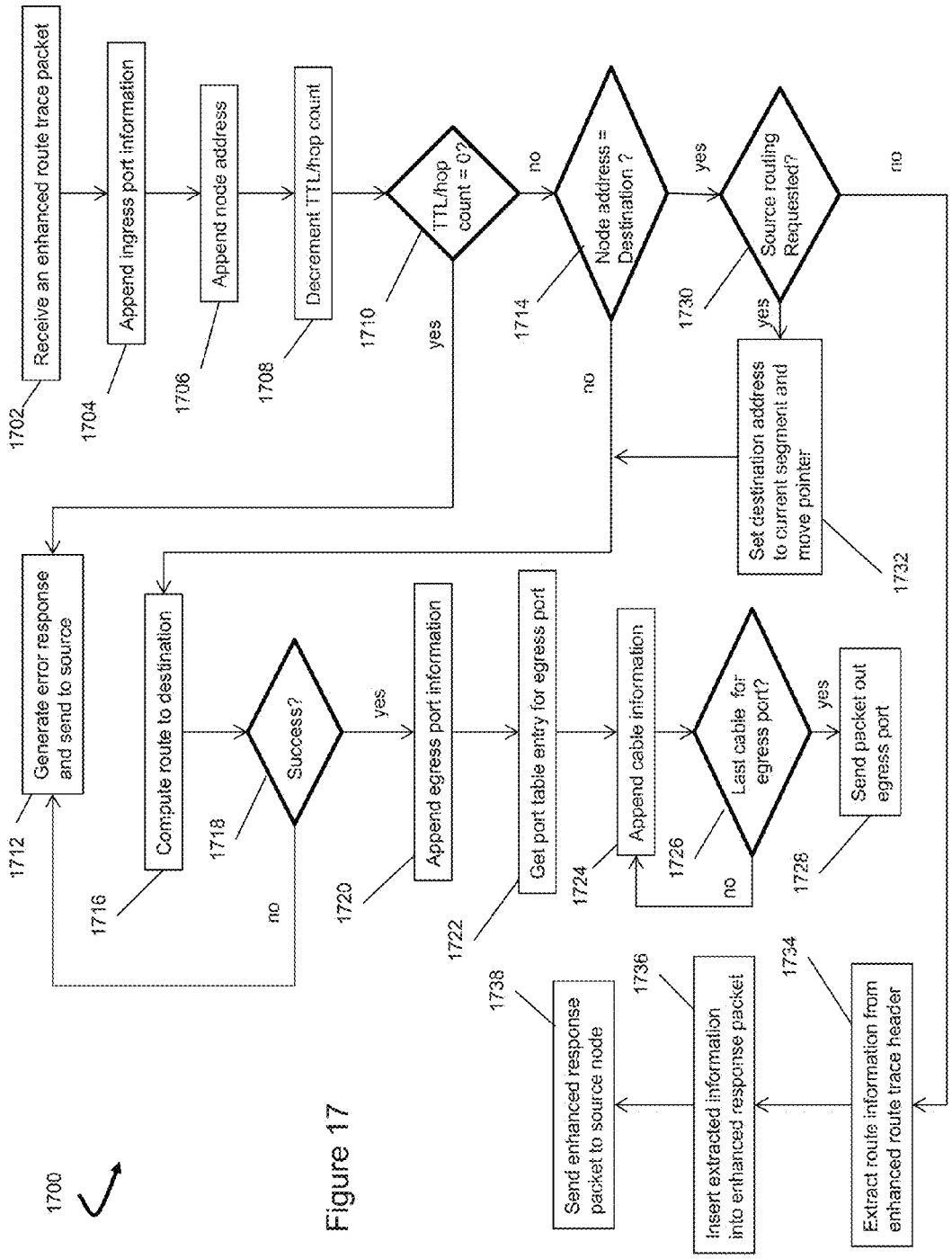
FIG. 17 is a flow chart of one embodiment of an exemplary method of route tracing.

FIG. 17 is a flow chart depicting one embodiment of a method 1700 of enhanced route tracing. The method can be implemented in a network node such as node 200 discussed above. It is to be understood that the steps are described in serial order for purposes of explanation only and that the order in which the steps are performed can be different from that described herein. For example, two or more steps can be performed substantially simultaneously, in some embodiments. In addition, it is to be understood that some steps can be omitted. For example, if the node is not configured to insert port information, then steps 1704 and 1720 can be omitted. Additionally, it is to be understood that if the node is a host node, such as a personal computer, as opposed to a router, then the steps related to computing a route, such as step 1716, can be omitted.

At block 1702, an enhanced route trace packet having an enhanced route trace header is received at the network node. The enhanced route trace header includes fields for information in addition to the node address. For example, the enhanced route trace header includes fields for ingress port, egress port, ingress cable, and/or egress cable, as described above.

At block 1704, the node inserts the ingress port information corresponding to the port over which the enhanced route trace packet is received. In addition, in some embodiments, the node inserts cable information corresponding to the ingress port over which the enhanced route trace packet was received. Such information includes the port ID, cable ID, and/or cable attributes, as discussed above. At block 1706, the node inserts its node address into the enhance route trace header. By inserting the port information prior to the node address, the node is configured to insert the relevant information in event chronological order. That is, the information is inserted in the order that it traverses the route (e.g. ingress port, node, egress port, egress cable, etc.)

At block 1708, the node decrements a hop count or time to live (TTL) value as described above. At block 1710, it is determined if the hop count or TTL value is equal to zero. If the hop count or TTL value is equal to zero, the node generates an error response containing the enhanced route trace information from the enhanced route trace header and sends the error response to the source node at block 1712. If the hop count or TTL value is not equal to zero, the node determines if a destination address in the enhanced route trace packet matches the node address of the node, at block 1714.

If the destination address does not match the node address, the node computes a route to the destination at block 1716. At block 1718, it is determined if the node is able to successfully compute a route to the destination. If the node cannot compute a route to the destination, the node generates an error response and sends the response to the source node at block 1712. If the node does compute a route to the destination, the node selects an egress port over which to forward the enhanced route trace packet on to its destination, and appends the egress port information to the enhanced route trace header as discussed above, at block 1720.

At block 1722, the node gets a port table entry associated with the selected egress port to obtain cable information. At block 1724, the node inserts cable information (e.g. cable ID, cable attributes) for the first cable in the list for the port table entry corresponding to the selected egress port. At block 1726, it is determined if there are additional cables in the list for the port table entry. If the there are additional cables (i.e. the last cable in the list has not yet been reached), the method returns to block 1724 where the node inserts the cable information for the next cable in the list. If there are no more cables in the list, the node forwards the enhanced route trace packet over the selected egress port at block 1728.

If the destination address does match the node address at block 1714, the node determines if source routing has been requested at block 1730. As described above, in some embodiments, the source node can specify one or more nodes for the enhanced route trace packet to traverse on the path to the destination node. For example, the source node can specify each node or only some nodes along the path. If source routing is enabled and the node is not the last node in the list of nodes specified by the source node, then the node sets the destination address in the packet to the current segment or node address pointed to in the enhanced route trace packet and updates the pointer to indicate the next node address in the list, at block 1732. The method then continues at block 1716 where the node computes a path to the destination node address. Thus, as understood by one of skill in the art, when source routing is enabled, the destination address is set in each node to the next node address in the list of specified nodes and the pointer is updated to indicate where the next node should look for the next destination address.

If source routing is not requested or the node address is the last node address in the list specified by the source node, the node extracts the route trace information from the enhanced route trace header, at block 1734. At block 1736, the node inserts the extracted information into an enhanced response packet, such as an enhanced ICMP response packet. At block 1738, the node sends the enhanced response packet to the source node of the enhanced route trace packet.

Example Embodiments

Example 1 includes Example 1 includes a network comprising: a destination node; a source node configured to output an enhanced route trace packet; and one or more intermediate nodes configured to forward the enhanced route trace packet toward the destination node based on a routing table until the enhanced route trace packet reaches the destination node; wherein each of the one or more intermediate nodes is further configured to insert identifying information into the enhanced route trace packet; wherein the destination node is configured to send a response packet to the source node containing all the identifying information entered by the one or more intermediate nodes, the destination node also configured to insert identifying information into the response packet.

Example 2 includes the network of Example 1, wherein the identifying information includes at least one of a node address, ingress port identification, ingress cable information, egress port identification, and egress cable information.

Example 3 includes the network of any of Examples 1-2, wherein the source node is configured to multicast the enhanced route trace packet to a plurality of destination nodes.

Example 4 includes the network of any of Examples 1-3, wherein the enhanced route trace packet is one of an Internet Protocol version 4 (IPv4) enhanced route trace packet or an Internet Protocol version 6 (IPv6) enhanced route trace packet.

Example 5 includes the network of any of Examples 1-4, wherein each of the intermediate nodes is configured to adjust the length of a data field in the enhanced route trace packet for insertion of the respective identifying information.

Example 6 includes the network of any of Examples 1-5, wherein the enhanced route trace packet includes a pointer field which indicates a next insertion point in a data field of the enhanced route trace packet; wherein each of the intermediate nodes is configured to update the pointer field such that each intermediate node inserts the respective identifying information in topological order.

Example 7 includes the network of any of Examples 1-6, wherein the response packet sent by the destination node is an enhanced Internet Control Message Protocol (ICMP) response message containing path information from the source node to the destination node based on the respective identifying information inserted by the one or more intermediate nodes and the destination node.

Example 8 includes the network of any of Examples 1-7, wherein each of the intermediate nodes is configured to insert the respective identifying information into the enhanced route trace packet via one or more Type Length Value (TLV) elements.

Example 9 includes a network node comprising: a plurality of ports each configured to receive and transmit data; a memory configured to store a routing table; and a processing unit configured to process an enhanced route trace packet received over one of the plurality of ports; wherein processing the enhanced route trace packet includes inserting identifying information into the enhanced route trace packet and determining over which of the plurality of ports to forward the enhanced route trace packet based on a destination node indicated in the enhanced route trace packet and the routing table.

Example 10 includes the network node of Example 9, wherein the identifying information includes at least one of a node address, ingress port identification, ingress cable information, egress port identification, and egress cable information.

Example 11 includes the network node of any of Examples 9-10, wherein the processing unit is configured to replicate the enhanced route trace packet based on a plurality of destination node addresses in the enhanced route trace packet.

Example 12 includes the network node of any of Examples 9-11, wherein the enhanced route trace packet is one of an Internet Protocol version 4 (IPv4) enhanced route trace packet or an Internet Protocol version 6 (IPv6) enhanced route trace packet.

Example 13 includes the network node of any of Examples 9-12, wherein the processing unit is configured to adjust the length of a data field in the enhanced route trace packet for insertion of the identifying information.

Example 14 includes the network node of any of Examples 9-13, wherein the enhanced route trace packet includes a pointer field which indicates a next insertion point in a data field of the enhanced route trace packet; wherein the processing unit is configured to update the pointer field after inserting the identifying information.

Example 15 includes the network node of any of Examples 9-14, wherein the processing unit is configured to insert the identifying information into the enhanced route trace packet via one or more Type Length Value (TLV) elements.

Example 16 includes a method of route tracing, the method comprising: receiving a route trace packet at a node, the route trace packet having an enhanced route trace header, the enhanced route trace header includes respective fields for at least one of ingress port identification (ID), egress port ID, ingress cable information, and egress cable information; inserting a node address of the node into the enhanced route trace header; determining if the node address matches a destination address in the route trace packet; If the node address matches the destination address: extracting information from the enhanced route trace header; inserting the extracted information into an enhanced response packet; and sending the enhanced response packet to a source node of the route trace packet; and if the node address does not match the destination address: selecting an egress port over which to forward the route trace packet based on the destination address; and forwarding the route trace packet via the selected egress port.

Example 17 includes the method of Example 16, wherein inserting the node address into the enhanced route trace header includes inserting at least one of ingress port identification (ID) and ingress cable information corresponding to the port over which the route trace packet was received.

Example 18 includes the method of any of Examples 16-17, further comprising: inserting at least one of egress port ID and egress cable information corresponding to the selected egress port into the enhanced route trace header prior to forwarding the route trace packet.

Example 19 includes the method of any of Examples 16-18, wherein the egress cable information and the ingress cable information includes one or more of cable ID, cable type, cable color, polarity, length, media, category, rating, and optical mode.

Example 20 includes the method of any of Examples 16-19, wherein inserting the node address comprises inserting the node address and other identifying information in event chronological order.

Example 21 includes the method of any of Examples 16-20, wherein inserting the node address comprises inserting the node address via a Time Length Value (TLV) element.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A network comprising:
a destination node;
a source node configured to output an enhanced route trace packet;
one or more intermediate nodes configured to forward the enhanced route trace packet toward the destination node based on a routing table until the enhanced route trace packet reaches the destination node;
wherein each of the one or more intermediate nodes is further configured to insert identifying information into the enhanced route trace packet;
wherein the destination node is configured to send a response packet to the source node containing all the identifying information entered by the one or more intermediate nodes, the destination node also configured to insert identifying information into the response packet, wherein the destination node sends the response packet when source routing is not requested or a node address for the destination node is a last node address in a list specified by the source node;
wherein the enhanced route trace packet satisfies one of Internet Protocol version 4 (IPv4) or Internet Protocol version 6 (IPv6).

2. The network of claim 1, wherein the identifying information includes at least one of a node address, ingress port identification, ingress cable information, egress port identification, and egress cable information.

3. The network of claim 1, wherein the source node is configured to multicast the enhanced route trace packet to a plurality of destination nodes.

4. The network of claim 1, wherein each of the intermediate nodes is configured to adjust the length of a data field in the enhanced route trace packet for insertion of the respective identifying information.

5. The network of claim 1, wherein the enhanced route trace packet includes a pointer field which indicates a next insertion point in a data field of the enhanced route trace packet;
wherein each of the intermediate nodes is configured to update the pointer field such that each intermediate node inserts the respective identifying information in topological order.

6. The network of claim 1, wherein the response packet sent by the destination node is an enhanced Internet Control Message Protocol (ICMP) response message containing path information from the source node to the destination node based on the respective identifying information inserted by the one or more intermediate nodes and the destination node.

7. The network of claim 1, wherein each of the intermediate nodes is configured to insert the respective identifying information into the enhanced route trace packet via one or more Type Length Value (TLV) elements.

8. A network node comprising:
a plurality of ports each configured to receive and transmit data;
a memory configured to store a routing table; and
a processing unit configured to process an enhanced route trace packet received over one of the plurality of ports;
wherein processing the enhanced route trace packet includes inserting identifying information into the enhanced route trace packet and determining over which of the plurality of ports to forward the enhanced route trace packet based on a destination node indicated in the enhanced route trace packet and the routing table, wherein the network node sends a response packet when the network node is the destination node and source routing is not requested or a node address for the network node is a last node address in a list specified by a source node;

wherein the enhanced route trace packet satisfies one of Internet Protocol version 4 (IPv4) or Internet Protocol version 6 (IPv6).

9. The network node of claim 8, wherein the identifying information includes at least one of a node address, ingress port identification, ingress cable information, egress port identification, and egress cable information.

10. The network node of claim 8, wherein the processing unit is configured to replicate the enhanced route trace packet based on a plurality of destination node addresses in the enhanced route trace packet.

11. The network node of claim 8, wherein the processing unit is configured to adjust the length of a data field in the enhanced route trace packet for insertion of the identifying information.

12. The network node of claim 8, wherein the enhanced route trace packet includes a pointer field which indicates a next insertion point in a data field of the enhanced route trace packet;

wherein the processing unit is configured to update the pointer field after inserting the identifying information.

13. The network node of claim 8, wherein the processing unit is configured to insert the identifying information into the enhanced route trace packet via one or more Type Length Value (TLV) elements.

14. A method of route tracing, the method comprising:
receiving a route trace packet at a node, the route trace packet having an enhanced route trace header, the enhanced route trace header includes respective fields for at least one of ingress port identification (ID), egress port ID, ingress cable information, and egress cable information;
inserting a node address of the node into the enhanced route trace header;
determining if the node address matches a destination address in the route trace packet;
if the node address matches the destination address and source routing is not requested or the node address is a last node address in a list specified by a source node, the method further comprises:
extracting information from the enhanced route trace header;
inserting the extracted information into an enhanced response packet; and
sending the enhanced response packet to a source node of the route trace packet; and
if the node address does not match the destination address:
selecting an egress port over which to forward the route trace packet based on the destination address; and
forwarding the route trace packet via the selected egress port;
wherein the enhanced route trace packet satisfies one of Internet Protocol version 4 (IPv4) or Internet Protocol version 6 (IPv6).

15. The method of claim 14, wherein inserting the node address into the enhanced route trace header includes inserting at least one of ingress port identification (ID) and ingress cable information corresponding to the port over which the route trace packet was received.

16. The method of claim 14, further comprising:
inserting at least one of egress port ID and egress cable information corresponding to the selected egress port into the enhanced route trace header prior to forwarding the route trace packet.

17. The method of claim 14, wherein the egress cable information and the ingress cable information includes one or more of cable ID, cable type, cable color, polarity, length, media, category, rating, and optical mode.

18. The method of claim 14, wherein inserting the node address comprises inserting the node address and other identifying information in event chronological order.

19. The method of claim 14, wherein inserting the node address comprises inserting the node address via a Time Length Value (TLV) element.

\* \* \* \* \*